US012451071B2

United States Patent

(12) United States Patent
Chun et al.

(10) Patent No.: US 12,451,071 B2
(45) Date of Patent: Oct. 21, 2025

(54) DISPLAY DEVICE AND METHOD OF OPERATING A DISPLAY DEVICE

(71) Applicant: SAMSUNG DISPLAY CO., LTD., Yongin-si (KR)

(72) Inventors: Byung Ki Chun, Yongin-si (KR); Woo-Chul Kim, Yongin-si (KR); Boodong Kwak, Yongin-si (KR); Soon-Dong Kim, Yongin-si (KR); Yu-Chol Kim, Yongin-si (KR); Kwangsuk Shin, Yongin-si (KR); Byungkil Jeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/771,722

(22) Filed: Jul. 12, 2024

(65) Prior Publication Data

US 2025/0022420 A1 Jan. 16, 2025

(30) Foreign Application Priority Data

Jul. 14, 2023 (KR) ........................ 10-2023-0091569

(51) Int. Cl.

| | |
|---|---|
| ***G09G 3/3233*** | (2016.01) |
| ***G09G 3/30*** | (2006.01) |
| ***G09G 3/3208*** | (2016.01) |
| ***G09G 3/3291*** | (2016.01) |

(52) U.S. Cl.

CPC ......... *G09G 3/3233* (2013.01); *G09G 3/3291* (2013.01); *G09G 2300/0819* (2013.01); *G09G 2300/0852* (2013.01); *G09G 2300/0861* (2013.01); *G09G 2320/068* (2013.01); *G09G 2358/00* (2013.01)

(58) Field of Classification Search

CPC ........................... G09G 3/3233; G09G 3/3291

See application file for complete search history.

(56) References Cited

U.S. PATENT DOCUMENTS

| | | | | |
|---|---|---|---|---|
| 11,416,640 | B2 * | 8/2022 | Acreman | G09G 3/36 |
| 2011/0175936 | A1 * | 7/2011 | Smith | G09G 3/20 359/464 |
| 2016/0225337 | A1 * | 8/2016 | Ek | G02B 27/288 |
| 2016/0225343 | A1 * | 8/2016 | Ek | G06T 1/20 |
| 2020/0241284 | A1 * | 7/2020 | Wu | G09G 3/32 |

FOREIGN PATENT DOCUMENTS

| | | | |
|---|---|---|---|
| KR | 10-2014-0085465 | A | 7/2014 |
| KR | 10-2102204 | B1 | 5/2020 |

* cited by examiner

*Primary Examiner* — Sardis F Azongha

(74) *Attorney, Agent, or Firm* — F. CHAU & ASSOCIATES, LLC

(57) ABSTRACT

A display device includes a display panel including first pixels arranged in a first row and second pixels arranged in a second row. A viewing angle of the first pixels is different from a viewing angle of the second pixels. The first pixels and the second pixels are disposed in a privacy region of the display panel and a public region of the display panel which is different from the privacy region. The display device further includes a panel driver configured to receive privacy region position information indicating a position of the privacy region, and drive the display panel such that the first pixels emit light in the privacy region of the display panel and the second pixels emit light in the public region of the display panel.

20 Claims, 14 Drawing Sheets

DISPLAY DEVICE AND METHOD OF OPERATING A DISPLAY DEVICE

CROSS-REFERENCE TO RELATED APPLICATION(S)

This application claims priority under 35 U.S.C. § 119 to Korean Patent Application No. 10-2023-0091569, filed on Jul. 14, 2023 in the Korean Intellectual Property Office (KIPO), the disclosure of which is incorporated by reference herein in its entirety.

TECHNICAL FIELD

Embodiments of the present inventive concept relate to a display device, and more particularly, to a display device including a privacy region, and a method of operating the display device.

DISCUSSION OF RELATED ART

In general, a display device may display an image with a wide viewing angle such that not only a user positioned in front of the display device, but also a user positioned on the side of the display device can view the image. However, recently, to protect personal information or to ensure safety in a display device mounted in a vehicle, a privacy mode has been developed in which the display device displays an image only to a user located in front of the display device.

A display device supporting the privacy mode may operate in a public mode or in the privacy mode. In the public mode, the entire region of a display panel may display an image with a relatively wide viewing angle, and in the privacy mode, the entire region of the display panel may display an image with a relatively narrow viewing angle.

SUMMARY

Some embodiments provide a display device capable of setting a partial region of a display panel as a privacy region and readily controlling a position and a size of the privacy region.

Some embodiments provide a method of operating a display device capable of setting a partial region of a display panel as a privacy region and readily controlling a position and a size of the privacy region.

According to embodiments, there is provided a display device including a display panel including first pixels arranged in a first row and second pixels arranged in a second row. A viewing angle of the first pixels is different from a viewing angle of the second pixels. The first pixels and the second pixels are disposed in a privacy region of the display panel and in a public region of the display panel which is different from the privacy region. The display device further includes a panel driver configured to receive privacy region position information indicating a position of the privacy region, and drive the display panel such that the first pixels emit light in the privacy region of the display panel and the second pixels emit light in the public region of the display panel.

In embodiments, the second pixels in the privacy region do not emit light, and the first pixels in the public region do not emit light.

In embodiments, the first pixels are privacy pixels, the second pixels are public pixels, and the viewing angle of the public pixels is greater than the viewing angle of the privacy pixels.

In embodiments, the first row is one of a plurality of odd-numbered rows of the display panel and the second row is one of a plurality of even-numbered rows of the display panel. The privacy pixels are arranged in the odd-numbered rows of the display panel, and the public pixels are arranged in the even-numbered rows of the display panel.

In embodiments, the first row is one of a plurality of even-numbered rows of the display panel and the second row is one of a plurality of odd-numbered rows of the display panel. The public pixels are arranged in the odd-numbered rows of the display panel, and the privacy pixels are arranged in the even-numbered rows of the display panel.

In embodiments, the privacy region position information includes a start position indicating an upper-left coordinate of the privacy region, and an end position indicating a lower-right coordinate of the privacy region.

In embodiments, the panel driver is further configured to receive input image data for the display panel, generate output image data by converting the input image data for the public region among the input image data for the first row into black data, and by converting the input image data for the privacy region among the input image data for the second row into the black data, and drive the display panel based on the output image data.

In embodiments, the panel driver includes a controller configured to receive the privacy region position information and input image data, and to generate output image data based on the privacy region position information and the input image data, and a data driver configured to provide data voltages to the first pixels and the second pixels based on the output image data.

In embodiments, the controller includes a privacy data generation block configured to receive the privacy region position information and the input image data, and to generate privacy image data by converting the input image data for the public region into black data, a public data generation block configured to receive the privacy region position information and the input image data, and to generate public image data by converting the input image data for the privacy region into the black data, and an image combination block configured to receive the privacy image data and the public image data, and to generate the output image data by combining the privacy image data for the first row and the public image data for the second row.

In embodiments, each of the first pixels and the second pixels includes a first transistor including a top gate connected to a gate node, a first terminal, a second terminal connected to a source node, and a bottom gate, a second transistor configured to apply a data voltage to the gate node in response to a writing signal, a third transistor configured to apply a reference voltage to the gate node in response to a reference signal, a fourth transistor configured to apply an initialization voltage to the source node in response to an initialization signal, a fifth transistor configured to connect a first power supply voltage line and the first terminal of the first transistor in response to an emission signal, a storage capacitor connected between the gate node and the source node, a holding capacitor configured to hold a voltage of the source node, and a light emitting element including an anode connected to the source node and a cathode connected to a second power supply voltage line. The light emitting element of each of the first pixels has a first viewing angle, and the light emitting element of each of the second pixels has a second viewing angle greater than the first viewing angle.

In embodiments, the second transistor includes a gate that receives the writing signal, a first terminal connected to a data line, and a second terminal connected to the gate node, the third transistor includes a gate that receives the reference signal, a first terminal connected to a line that transfers the reference voltage, and a second terminal connected to the gate node, the fourth transistor includes a gate that receives the initialization signal, a first terminal connected to the source node, and a second terminal connected to a line that transfers the initialization voltage, and the fifth transistor includes a gate that receives the emission signal, a first terminal connected to the first power supply voltage line, and a second terminal connected to the first terminal of the first transistor.

According to embodiments, there is provided a display device including a display panel including first pixels arranged in odd-numbered rows and second pixels arranged in even-numbered rows. A viewing angle of the first pixels is different from a viewing angle of the second pixels. The first pixels and the second pixels are disposed in a privacy region of the display panel, and the first pixels and the second pixels are disposed in a public region of the display panel which is different from the privacy region. The display device further includes a controller configured to receive privacy region position information and input image data, to generate output image data by converting the input image data for the second pixels within the privacy region having a position indicated by the privacy region position information into black data, and by converting the input image data for the first pixels within the public region into the black data, and a data driver configured to provide data voltages to the first pixels and the second pixels based on the output image data.

In embodiments, in the privacy region, the first pixels emit light and the second pixels do not emit light. In the public region, the first pixels do not emit light and the second pixels emit light.

In embodiments, the first pixels are privacy pixels, the second pixels are public pixels, and the viewing angle of the public pixels is greater than the viewing angle of the privacy pixels.

In embodiments, the privacy region position information includes a start position indicating an upper-left coordinate of the privacy region, and an end position indicating a lower-right coordinate of the privacy region.

In embodiments, the controller includes a privacy data generation block configured to receive the privacy region position information and the input image data, and to generate privacy image data by converting the input image data for the public region into the black data, a public data generation block configured to receive the privacy region position information and the input image data, and to generate public image data by converting the input image data for the privacy region into the black data, and an image combination block configured to receive the privacy image data and the public image data, and to generate the output image data by combining the privacy image data for the odd-numbered rows and the public image data for the even-numbered rows.

According to embodiments, there is provided a method of operating a display device. In the method, privacy region position information indicating a position of a privacy region is received, input image data for first pixels arranged in odd-numbered rows and second pixels arranged in even-numbered rows and having a viewing angle different from a viewing angle of the first pixels are received, output image data are generated by converting the input image data for the second pixels within the privacy region into black data and by converting the input image data for the first pixels within a public region other than the privacy region into the black data, and data voltages are provided to the first pixels and the second pixels based on the output image data.

In embodiments, in the privacy region, the first pixels emit light and the second pixels do not emit light. In the public region, the first pixels do not emit light and the second pixels emit light.

In embodiments, the first pixels are privacy pixels having a first viewing angle, and the second pixels are public pixels having a second viewing angle greater than the first viewing angle.

In embodiments, the privacy region position information includes a start position indicating an upper-left coordinate of the privacy region, and an end position indicating a lower-right coordinate of the privacy region.

As described above, in a display device and a method of operating the display device according to embodiments, first pixels may be arranged in a first row of a display panel, and second pixels having a viewing angle different from a viewing angle of the first pixels may be arranged in a second row of the display panel. A panel driver may receive privacy region position information indicating a position of a privacy region, and may drive the display panel such that the first pixels emit light in the privacy region and the second pixels emit light in a public region other than the privacy region. Accordingly, a partial region of the display panel may be set as the privacy region, the remaining region of the display panel may be set as the public region, an image may be displayed with a first viewing angle (e.g., a narrow viewing angle) in the privacy region, and an image may be displayed with a second viewing angle (e.g., a wide viewing angle) in the public region. Further, a position and a size of the privacy region can be readily controlled.

BRIEF DESCRIPTION OF THE DRAWINGS

The above and other features of the inventive concept will become more apparent by describing in detail embodiments thereof with reference to the accompanying drawings.

DETAILED DESCRIPTION OF EMBODIMENTS

Figure 1:
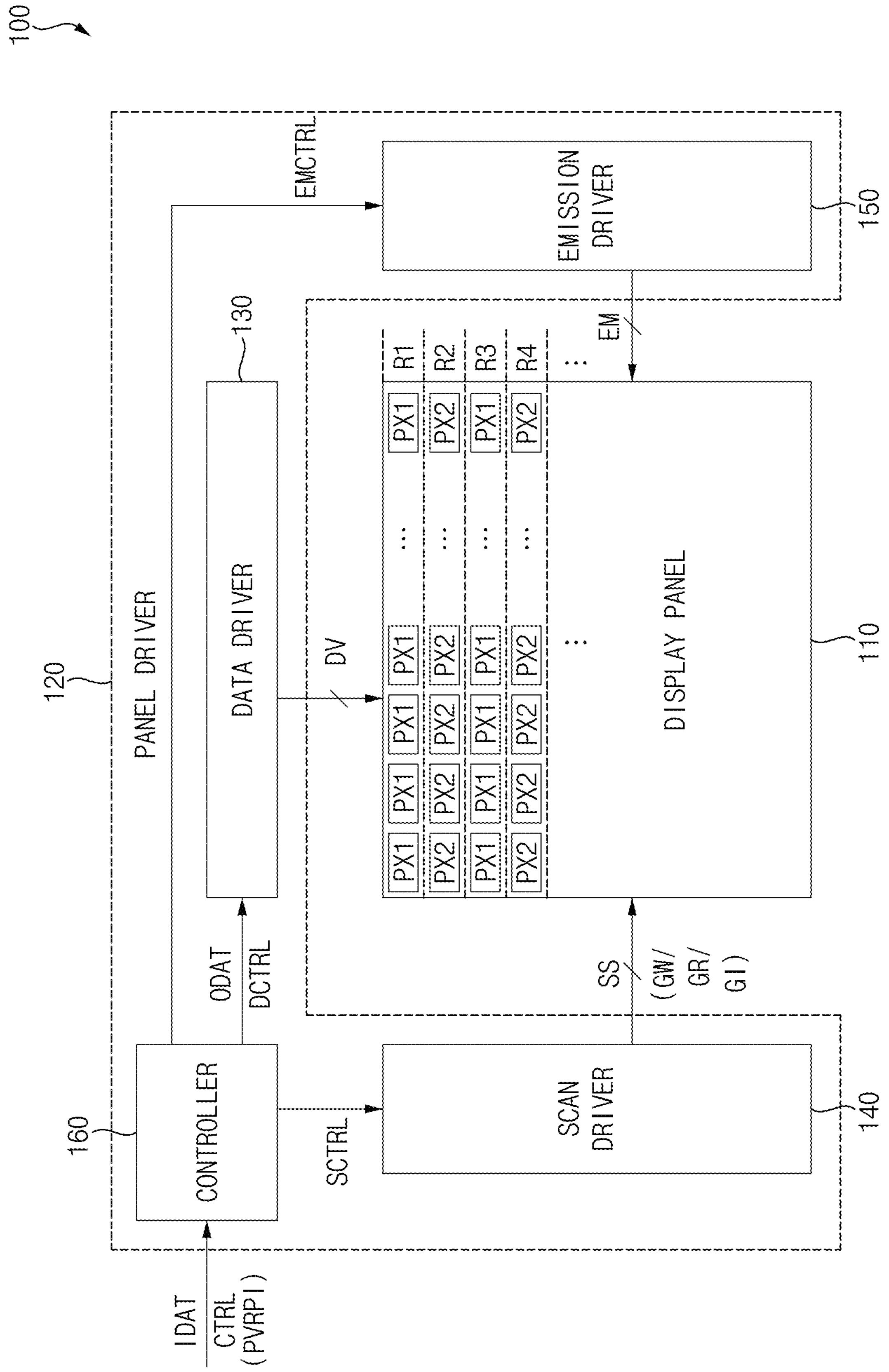
FIG. 1 is a block diagram illustrating a display device according to embodiments.

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Figure 2:
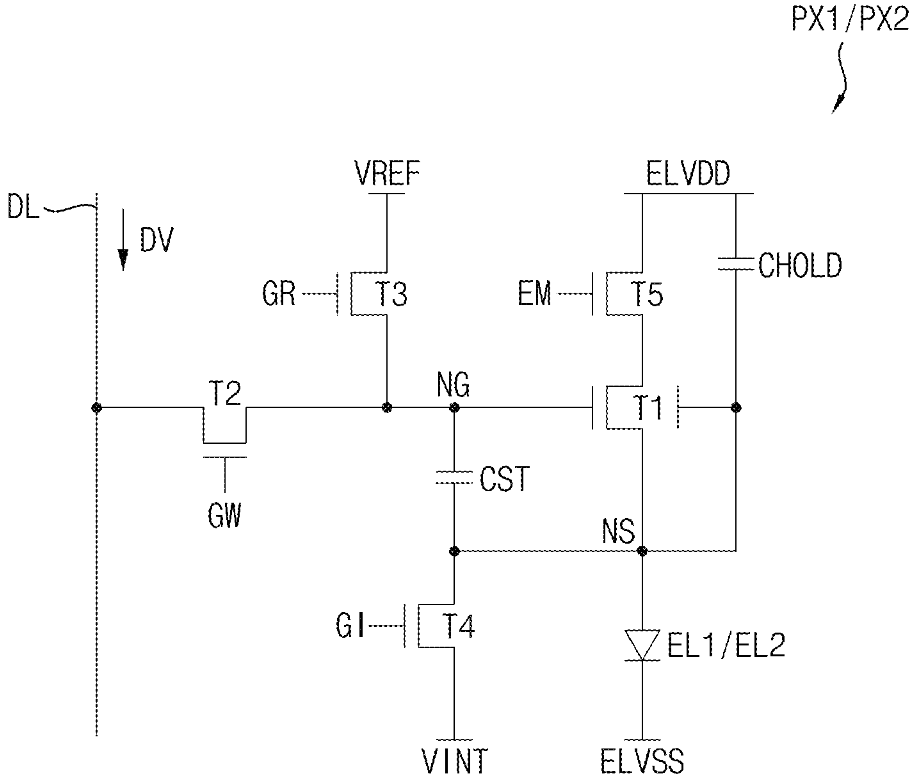
FIG. 2 is a circuit diagram illustrating an example of a first pixel or a second pixel included in a display device according to embodiments.
Figure 3:
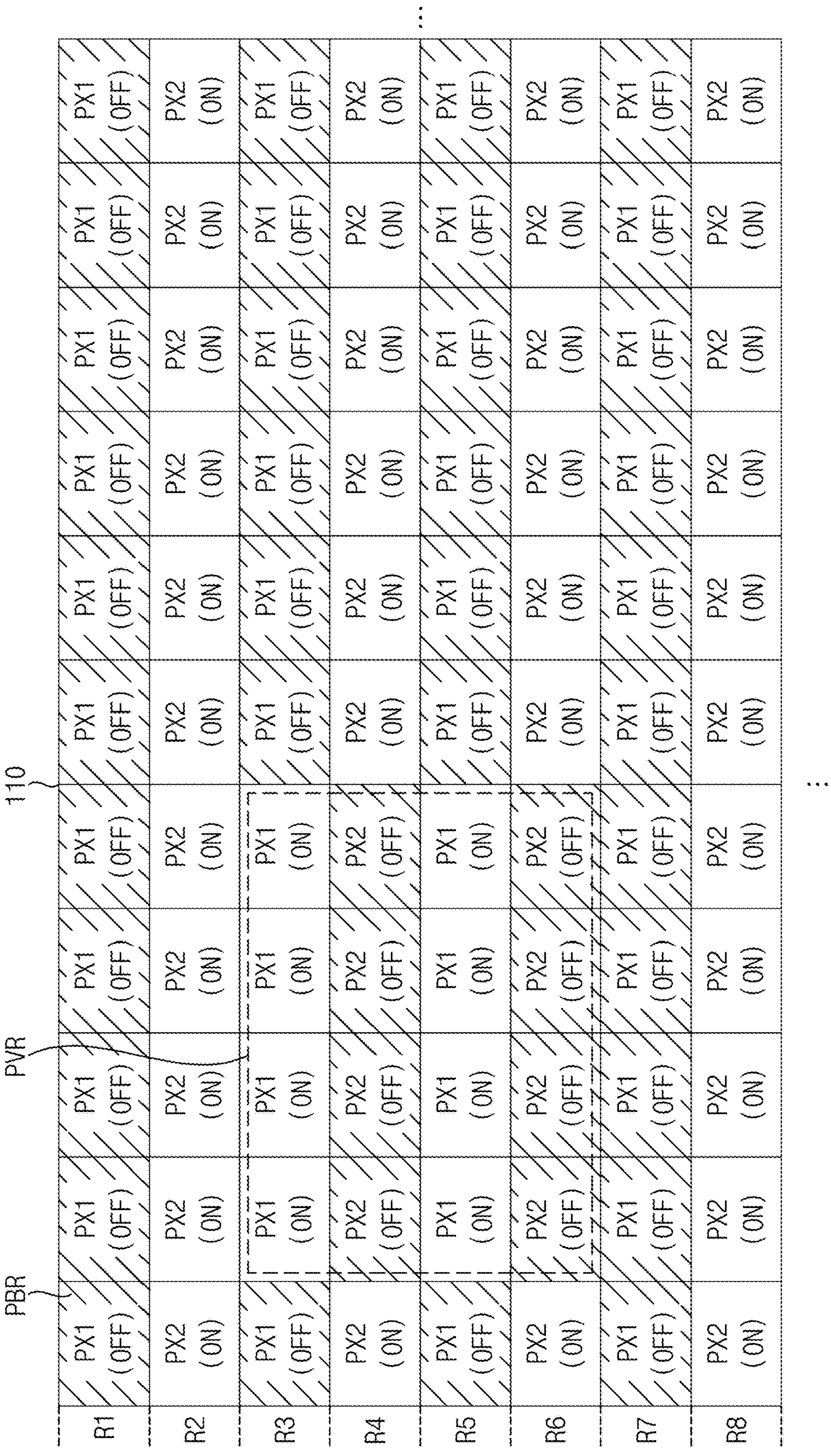
FIG. 3 is a diagram illustrating an example of a privacy region and a public region of a display panel.

FIG. 1 is a block diagram illustrating a display device according to embodiments. FIG. 2 is a circuit diagram illustrating an example of a first pixel or a second pixel included in a display device according to embodiments. FIG. 3 is a diagram illustrating an example of a privacy region and a public region of a display panel.

Referring to FIG. 1, a display device 100 according to embodiments may include a display panel 110 that includes first pixels PX1 and second pixels PX2, and a panel driver 120 (also referred to as a panel driver circuit) that drives a display panel 110. The panel driver 120 may include a data driver 130 (also referred to as a data driver circuit) that provides data voltages DV to the first and second pixels PX1 and PX2, and a controller 160 (also referred to as a controller circuit) that controls an operation of the display device 100. In some embodiments, the panel driver 120 may further include a scan driver 140 (also referred to as a scan driver circuit) that provides scan signals SS to the first and second pixels PX1 and PX2, and/or an emission driver 150 (also referred to as an emission driver circuit) that provides emission signals EM to the first and second pixels PX1 and PX2.

The display panel 110 may include the first pixels PX1 arranged in a first row R1, and the second pixels PX2 arranged in a second row R2 and having a viewing angle different from a viewing angle of the first pixels PX1. In some embodiments, the first pixels PX1 may be privacy pixels having a first viewing angle, and the second pixels PX2 may be public pixels having a second viewing angle greater than the first viewing angle. Further, the first pixel PX1, or the privacy pixel may be referred to as a narrow pixel having a narrow viewing angle, and the second pixel PX2, or the public pixel may be referred to as a wide pixel having a wide viewing angle. In addition, in some embodiments, as illustrated in FIG. 1, the first pixels PX1, or the privacy pixels may be arranged in odd-numbered rows R1, R3, . . . of the display panel 110, and the second pixels PX2, or the public pixels may be arranged in even-numbered rows R2, R4, . . . of the display panel 110.

In some embodiments, the first pixel PX1 and the second pixel PX2 may have substantially the same structure, except that the first pixel PX1 and the second pixel PX2 have different viewing angles. For example, as illustrated in FIG. 2, each of the first and second pixels PX1 and PX2 may include a first transistor T1, a second transistor T2, a third transistor T3, a fourth transistor T4, a fifth transistor T5, a storage capacitor CST, a holding capacitor CHOLD and a light emitting element EL1/EL2.

The first transistor T1 may generate a driving current to be provided to the light emitting element EL1/EL2 based on a voltage between a gate node NG and a source node NS, or a voltage stored in the storage capacitor CST. In some embodiments, the gate node NG may be connected to a top gate of the first transistor T1, and the source node NS may be connected to a second terminal (e.g., a source) of the first transistor T1. The first transistor T1 may be referred to as a driving transistor that drives the light emitting element EL1/EL2. In some embodiments, the first transistor T1 may include a top gate connected to the gate node NG, a first terminal connected to a first power supply voltage line that transfers a first power supply voltage ELVDD (e.g., a high power supply voltage), a second terminal connected to the source node NS, and a bottom gate connected to the source node NS. That is, the first transistor T1 may have a double gate structure including the top gate and the bottom gate.

The second transistor T2 may apply the data voltage DV of a data line DL to the gate node NG in response to a writing signal GW. The second transistor T2 may be referred to as a scan transistor that transfers the data voltage DV of the data line DL. In some embodiments, the second transistor T2 may include a gate that receives the writing signal GW, a first terminal connected to the data line DL, and a second terminal connected to the gate node NG.

The third transistor T3 may apply a reference voltage VREF to the gate node NG in response to a reference signal GR. The third transistor T3 may be referred to as a reference transistor that transfers the reference voltage VREF to the gate node NG. In some embodiments, the third transistor T3 may include a gate that receives the reference signal GR, a first terminal connected to a line that transfers the reference voltage VREF, and a second terminal connected to the gate node NG.

The fourth transistor T4 may apply an initialization voltage VINT to the source node NS in response to an initialization signal GI. The fourth transistor T4 may be referred to as an initialization transistor that initializes the source node NS. In some embodiments, the fourth transistor T4 may include a gate that receives the initialization signal GI, a first terminal connected to the source node NS, and a second terminal connected to a line that transfers the initialization voltage VINT.

The fifth transistor T5 may connect the first power supply voltage line and the first terminal of the first transistor T1 in response to the emission signal EM. The fifth transistor T5 may be referred to as an emission transistor that forms a path of the driving current from the first power supply voltage line that transfers the first power supply voltage ELVDD to a second power supply voltage line that transfers a second power supply voltage ELVSS (e.g., a low power supply voltage). In some embodiments, the fifth transistor T5 may include a gate that receives the emission signal EM, a first terminal connected to the first power supply voltage line, and a second terminal connected to the first terminal of the first transistor T1.

The storage capacitor CST may store the data voltage DV transferred through the second transistor T2 from the data line DL. The storage capacitor CST may be connected between the gate node NG and the source node NS. In some embodiments, the storage capacitor CST may include a first electrode connected to the gate node NG, and a second electrode connected to the source node NS.

The holding capacitor CHOLD may hold a voltage of the source node NS. The holding capacitor CHOLD may be connected between the first power supply voltage line and the source node NS. In some embodiments, the holding capacitor CHOLD may include a first electrode connected to the first power supply voltage line, and a second electrode connected to the source node NS.

The light emitting element EL1/EL2 may emit light based on the driving current generated by the first transistor T1. In some embodiments, the light emitting element EL1/EL2 may be, for example, an organic light emitting diode (OLED), but is not limited thereto. In some embodiments, the light emitting element EL1/EL2 may be any suitable light emitting element. For example, the light emitting element EL1/EL2 may be a micro light emitting diode, a nano light emitting diode (NED), a quantum dot (QD) light emitting diode, an inorganic light emitting diode, or any other suitable light emitting element. In some embodiments, the light emitting element EL1/EL2 may include an anode connected to the source node NS, and a cathode connected to the second power supply voltage line.

The light emitting element EL1 of the first pixel PX1 may have the first viewing angle, and the light emitting element EL2 of the second pixel PX2 may have the second viewing angle greater than the first viewing angle. That is, the light emitting element EL1 of the first pixel PX1 may have a relatively narrow viewing angle, and the light emitting element EL2 of the second pixel PX2 may have a relatively wide viewing angle. In some embodiments, to have the relatively narrow viewing angle, the light emitting element EL1 of the first pixel PX1 may include, but is limited not to, a light emitting layer and a partition that prevents light emitted by the light emitting layer from spreading laterally.

Although FIG. 2 illustrates an example in which each of the first and second pixels PX1 and PX2 has a 5T2C structure, a structure of each of the first and second pixels PX1 and PX2 is not limited to the example in FIG. 2. Further, although FIG. 2 illustrates an example in which the first through fifth transistors T1 through T5 are implemented as n-type metal-oxide-semiconductor (NMOS) transistors, the first through fifth transistors T1 through T5 are not limited to the example in FIG. 2. For example, some or all of the first through fifth transistors T1 through T5 may be implemented as p-type metal-oxide-semiconductor (PMOS) transistors.

The data driver 130 may generate the data voltages DV based on output image data ODAT and a data control signal DCTRL received from the controller 160, and may provide the data voltages DV to the first and second pixels PX1 and PX2. In some embodiments, the data control signal DCTRL may include, but is not limited to, an output data enable signal, a horizontal start signal and a load signal. Further, in some embodiments, the data driver 130 and the controller 160 may be implemented as a single integrated circuit, and the single integrated circuit may be referred to as a timing controller embedded data driver (TED). In some embodiments, the data driver 130 and the controller 160 may be implemented as separate integrated circuits.

The scan driver 140 generate the scan signals SS based on a scan control signal SCTRL received from the controller 160, and may sequentially provide the scan signals SS to the first pixels PX1 and the second pixels PX2 on a row-by-row basis. In some embodiments, the scan control signal SCTRL may include, but is not limited to, a scan start signal and a scan clock signal. Further, in some embodiments, the scan signal SS applied to each of the first and second pixels PX1 and PX2 may include, but is not limited to, the writing signal GW, the reference signal GR and the initialization signal GI illustrated in FIG. 2. In some embodiments, the scan driver 140 may be integrated or formed in the display panel 110. In some embodiments, the scan driver 140 may be implemented as an integrated circuit.

The emission driver 150 may generate the emission signals EM based on an emission control signal EMCTRL received from the controller 650, and may sequentially provide the emission signals EM to the first pixels PX1 and the second pixels PX2 on a row-by-row basis. In some embodiments, the emission control signal EMCTRL may include, but is not limited to, an emission start signal and an emission clock signal. In some embodiments, the emission driver 150 may be integrated or formed in the display panel 110. In some embodiments, the emission driver 150 may be implemented as an integrated circuit.

The controller 160 (e.g., a timing controller (TCON)) may receive input image data IDAT and a control signal CTRL from an external host processor (e.g., an application processor (AP), a graphics processing unit (GPU), a graphics card, etc.). The control signal CTRL may include privacy region position information PVRPI indicating a position of a privacy region. In some embodiments, the control signal CTRL may further include, but is not limited to, a vertical synchronization signal, a horizontal synchronization signal, an input data enable signal and a master clock signal. The controller 160 may generate the output image data ODAT, the data control signal DCTRL, the scan control signal SCTRL and the emission control signal EMCTRL based on the input image data IDAT and the control signal CTRL. The controller 160 may control the data driver 130 by providing the output image data ODAT and the data control signal DCTRL to the data driver 130, may control the scan driver 140 by providing the scan control signal SCTRL to the scan driver 140, and may control the emission driver 150 by providing the emission control signal EMCTRL to the emission driver 150.

In the display device 100 according to embodiments, the panel driver 120 may receive the privacy region position information PVRPI indicating the position of the privacy region. In some embodiments, the privacy region may have a rectangular shape, and the privacy region position information PVRPI may include, but is not limited to, a start position indicating an upper-left coordinate of the privacy region and an end position indicating a lower-right coordinate of the privacy region. The panel driver 120 may set at least a partial region of the display panel 110 as the privacy region based on the privacy region position information PVRPI. Further, the panel driver 120 may set the remaining region of the display panel 110 excluding the privacy region as a public region.

In some embodiments, the panel driver 120 may drive the display panel 110 such that the first pixels PX1 emit light in the privacy region and the second pixels PX2 emit light in the public region. Further, in some embodiments, the panel driver 120 may drive the display panel 110 such that the second pixels PX2 in the privacy region do not emit light and the first pixels PX1 in the public region do not emit light. In some embodiments, so that the first pixels PX1 emit light and the second pixels PX2 do not emit light in the privacy region, and the second pixels PX2 emit light and the first pixels PX2 do not emit light in the public region, the controller 160 of the panel driver 120 may generate the output image data ODAT by converting the input image data IDAT for the public region among the input image data IDAT for the odd-numbered rows R1, R3, . . . in which the first pixels PX1 are arranged into black data and by converting the input image data IDAT for the privacy region among the input image data IDAT for the even-numbered rows R2, R4, . . . in which the second pixels PX2 are arranged into the black data. Here, the black data may be image data corresponding to the data voltage DV for each pixel PX1/PX2 not to emit light, and may be, for example, image data representing a 0-gray level. In this case, the data driver 130 may provide the data voltages DV corresponding to the input image data IDAT to the first pixels PX1 in the privacy region, and may provide the data voltages DV corresponding to the black data to the second pixels PX2 in the privacy region. Thus, in some embodiments, in the privacy region, the first pixels PX1 may display an image based on the data voltages DV corresponding to the input image data IDAT, and the second pixels PX2 do not emit light based on the data voltages DV corresponding to the 0-gray level. Further, the data driver 130 may provide the data voltages DV corresponding to the input image data IDAT to the second pixels PX2 in the public region, and may provide the data voltages DV corresponding to the black data to the first pixels PX1 in the public region. Thus, in some embodiments, in the public region, the second pixels PX2 may display an image based on the data voltages DV corresponding to the input image data IDAT, and the first pixels PX1 do not emit light based on the data voltages DV corresponding to the 0-gray level.

For example, as illustrated in FIG. 3, the first pixels PX1, or the privacy pixels may be arranged in the odd-numbered rows R1, R3, R5, R7, . . . of the display panel 110, and the second pixels PX2, or the public pixels may be arranged in the even-numbered rows R2, R4, R6, R8, . . . of the display panel 110. Further, in a case where the privacy region position information PVRPI indicates a second column and a third row R3 as the start position, and indicates a fifth column and a sixth row R6 as the end position, the panel driver 120 may set a region where the third through sixth rows R3, R4, R5 and R6 intersect the second through fifth columns as the privacy region PVR. Further, the panel driver 120 may set the remaining region of the display panel 110 excluding the privacy region PVR as the public region PBR.

The controller 160 may convert the input image data (IDAT) for the public region PBR among the input image data IDAT for the odd-numbered rows R1, R3, R5, R7, . . . into the black data. That is, the controller 160 may convert the input image data IDAT for the first and seventh rows R1 and R7 into the black data, and may convert the input image data IDAT for columns excluding the second through fifth columns among the input image data IDAT for the third and fifth rows R3 and R5 into the black data.

Further, the controller 160 may convert the input image data IDAT for the privacy region PVR among the input image data IDAT for the even-numbered rows R2, R4, R6, R8, . . . into the black data. That is, the controller 160 may convert the input image data IDAT for the second through fifth columns among the input image data IDAT for the fourth and sixth rows R4 and R6 into the black data.

Accordingly, the second pixels PX2 in the privacy region PVR, or the second pixels PX2 located in the fourth and sixth rows R4 and R6 and the second through fifth columns may receive the data voltages DV corresponding to the black data, or the data voltages DV corresponding to the 0-gray level, and may be OFF (do not emit light) based on the data voltages DV corresponding to the 0-gray level. The first pixels PX1 in the privacy region PVR, or the first pixels PX1 located in the third and fifth rows R3 and R5 and the second through fifth columns may receive the data voltages DV corresponding to the input image data IDAT, and may be ON (may emit light) based on the data voltages DV corresponding to the input image data IDAT. Therefore, since only the first pixels PX1 having the first viewing angle, or the privacy pixels having the relatively narrow viewing angle emit light in the privacy region PVR, the privacy region PVR may display an image with the relatively narrow viewing angle, and the image displayed in the privacy region PVR may be viewed only by a user located in front of the display device 100.

Further, the first pixels PX1 in the public region PBR may receive the data voltages DV corresponding to the black data, or the data voltages DV corresponding to the 0-gray level, and may be OFF (do not emit light) based on the data voltages DV corresponding to the 0-gray level. The second pixels PX2 in the public region PBR may receive the data voltages DV corresponding to the input image data IDAT, and may be ON (may emit light) based on the data voltages DV corresponding to the input image data IDAT. Therefore, since the second pixels PX2 having the second viewing angle, or the public pixels having the relatively wide viewing angle emit light in the public region PBR, the public region PBR may display an image with the relatively wide viewing angle.

As described above, in the display device 100 according to embodiments, the first pixels PX1, or the privacy pixels may be arranged in the odd-numbered rows R1, R3, . . . of the display panel 110, and the second pixels PX2, or the public pixels may be arranged in the even-numbered rows R2, R4, . . . of the display panel 110. The panel driver 120 may drive the display panel 110 by modulating the input image data IDAT such that the first pixels PX1 may emit light in the privacy region PVR and the second pixels PX may emit light in the public region PBR. Accordingly, a partial region of the display panel 110 may be set as the privacy region PVR, the remaining region of the display panel 110 may be set as the public region PBR, an image may be displayed with a narrow viewing angle in the privacy region PVR, and an image may be displayed with a wide viewing angle in the public region PBR. Further, the position and the size of the privacy region PVR may be readily controlled.

FIGS. 4A through 4D are schematic diagrams illustrating examples of a privacy region and a public region of a display panel.

Referring to FIGS. 4A through 4D, a display panel 110 may include a first display region DR1, a second display region DR2 located adjacent to the first display region DR1 in a first direction D1 (e.g., a horizontal direction or a row direction), and a third display region DR3 located adjacent to the second display region DR1 in the first direction D1. In some embodiments, the display panel 110 may be a display panel of a display device mounted on a vehicle. For example, the first display region DR1 of the display panel 110 may face a driver, the third display region DR3 of the display panel 110 may face a passenger, and the second display region DR2 of the display panel 110 may face a space between the driver and the passenger.

Figure 4A:
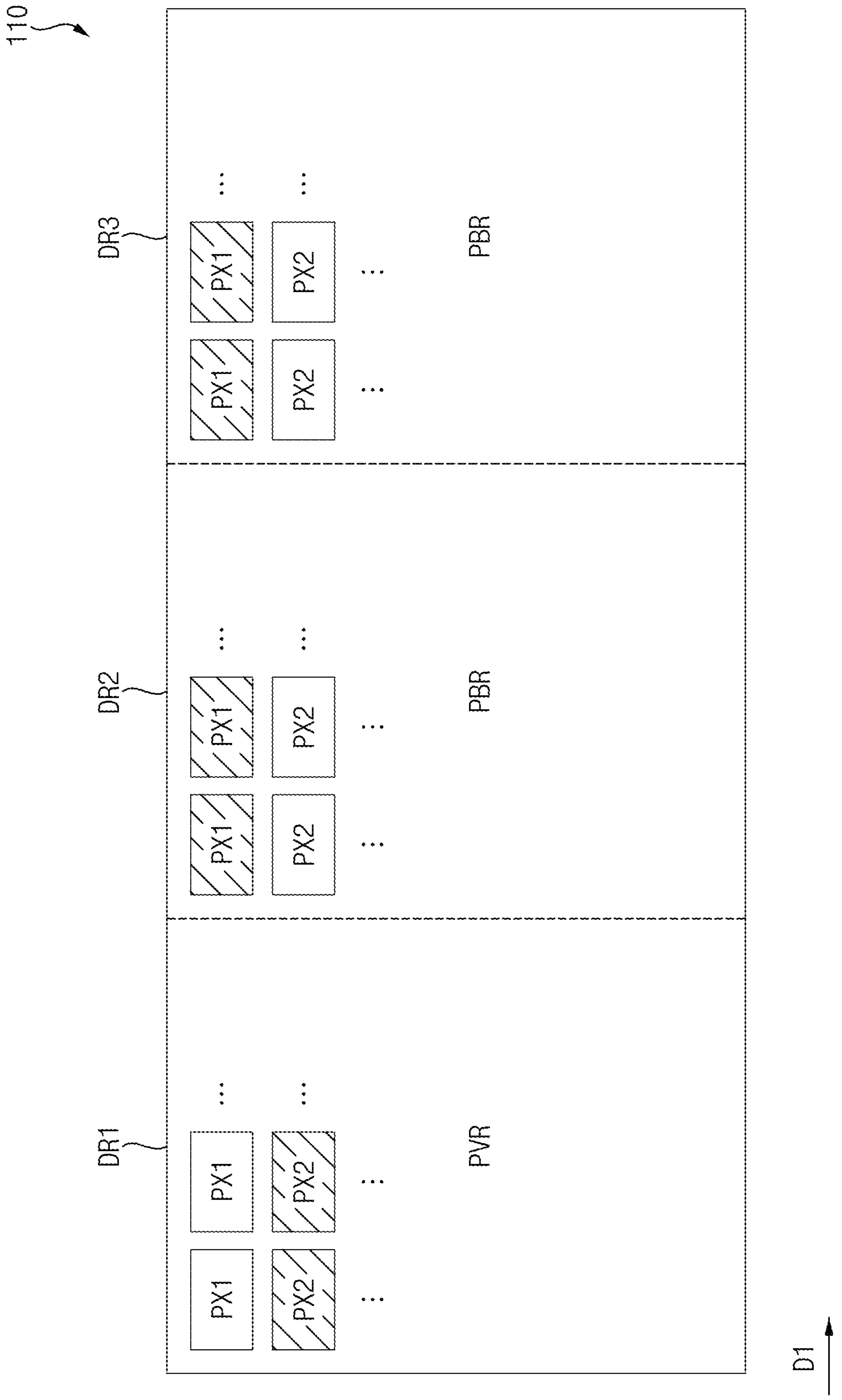
FIGS. 4A through 4D are schematic diagrams illustrating examples of a privacy region and a public region of a display panel.

In an example, as illustrated in FIG. 4A, the first display region DR1 may be set as a privacy region PVR, and the second and third display regions DR2 and DR3 may be set as a public region PBR. In this case, in the first display region DR1, first pixels PX1 having a relatively narrow viewing angle emit light, and second pixels PX2 having a relatively wide viewing angle do not emit light. Thus, an image displayed in the first display region DR1 is visible to the driver, but is not visible to the passenger. Further, in the second and third display regions DR2 and DR3, the first pixels PX1 do not emit light, and the second pixels PX2 emit light.

Figure 4B:
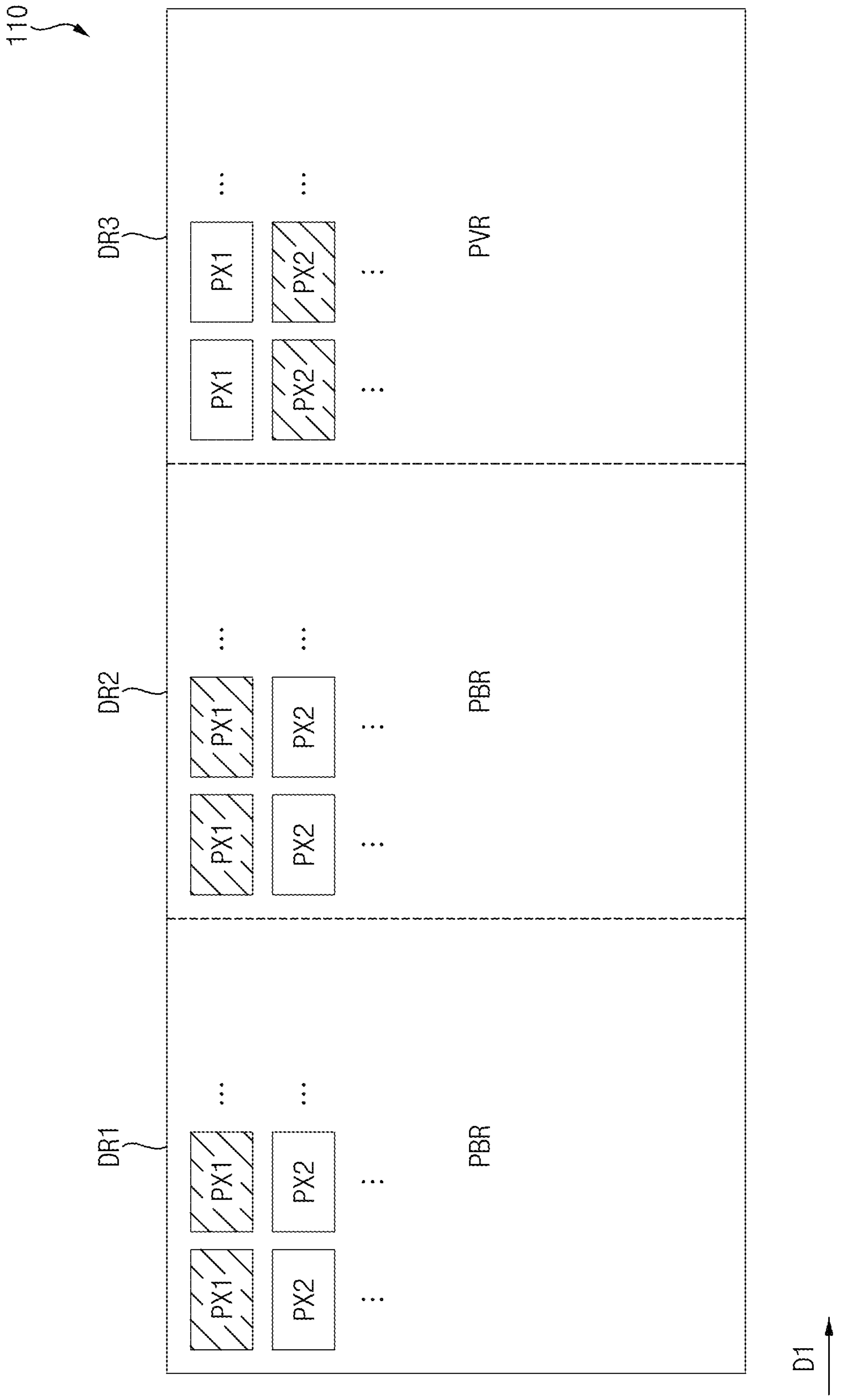

In an example, as illustrated in FIG. 4B, the third display region DR3 may be set as the privacy region PVR, and the first and second display regions DR1 and DR2 may be set as the public region PBR. In this case, in the third display region DR3, the first pixels PX1 having the narrow viewing angle emit light, and the second pixels PX2 having the wide viewing angle do not emit light. Thus, an image displayed in the third display region DR3 is visible to the passenger, but is not visible to the driver. Further, in the first and second display regions DR1 and DR2, the first pixels PX1 do not emit light, and the second pixels PX2 emit light.

Figure 4C:
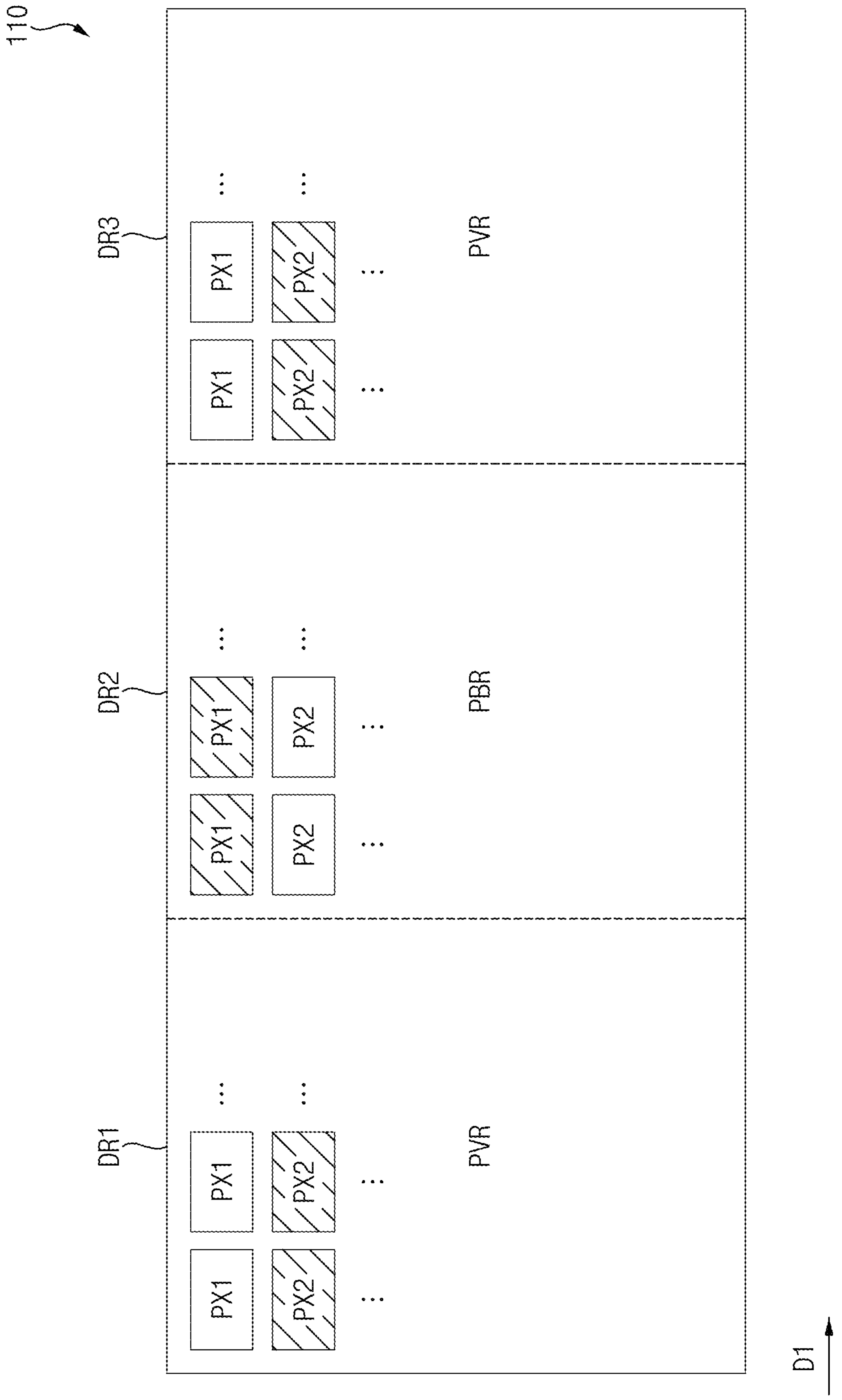

In an example, as illustrated in FIG. 4C, the first and third display regions DR1 and DR3 may be set as the privacy region PVR, and the second display region DR2 may be set as the public region PBR. In this case, in the first and third display regions DR1 and DR3, the first pixels PX1 having the narrow viewing angle emit light, and the second pixels PX2 having the wide viewing angle do not emit light. Thus, an image displayed in the first display region DR1 is visible only to the driver, and an image displayed in the third display region DR3 is visible only to the passenger. Further, in the second display region DR2, the first pixels PX1 do not emit light, and the second pixels PX2 emit light.

Figure 4D:
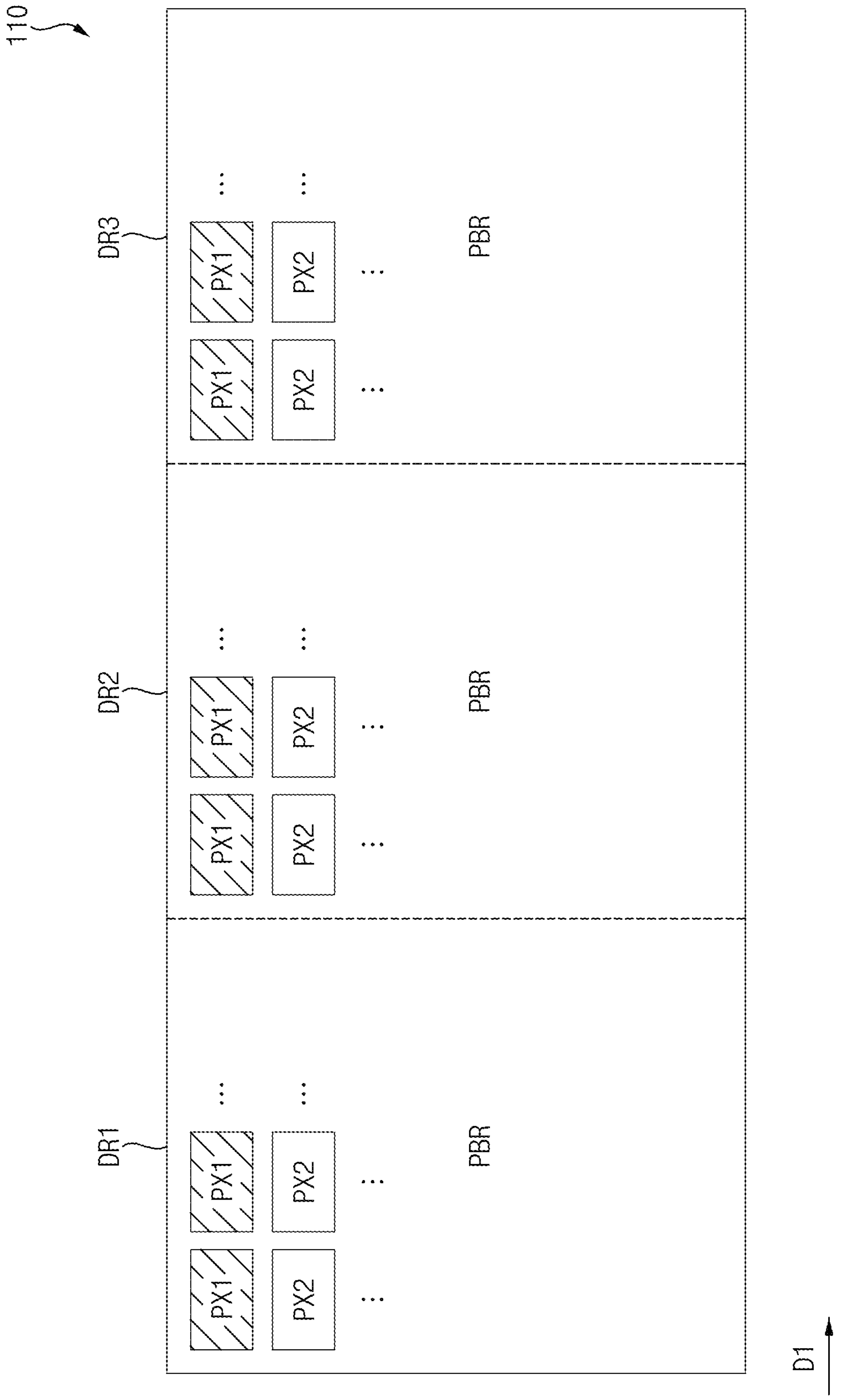

In an example, as illustrated in FIG. 4D, the first, second and third display regions DR1, DR2 and DR3 may be set as the public region PBR. In this case, in the first, second and third display regions DR1, DR2 and DR3, the first pixels PX1 do not emit light, and the second pixels PX2 emit light. Thus, an image displayed in the first, second and third display regions DR1, DR2 and DR3 is visible to both the driver and the passenger.

Although FIGS. 4A through 4D illustrate examples where the display panel 110 is divided into three display regions DR1, DR2 and DR3, and each of the three display regions DR1, DR2 and DR3 is set as the privacy region PVR or the public region PBR, embodiments of the present inventive concept are not limited to these examples. For example, the display panel 110 may be divided into two display regions, or may be divided into four or more display regions according to embodiments. Further, in some embodiments, only a portion of one or more display regions DR1, DR2 and DR3 of the display panel 110 may be set as the privacy region PVR. In addition, although FIGS. 4A through 4D illustrate examples where the display panel 110 is divided along the first direction D1, embodiments of the present inventive concept are not limited to these examples. For example, the display panel 110 may be divided along a second direction substantially perpendicular to the first direction D1, may be divided along both of the first direction D1 and the second direction, or may be divided into along a direction different from the first direction D1 and the second direction.

Figure 5:
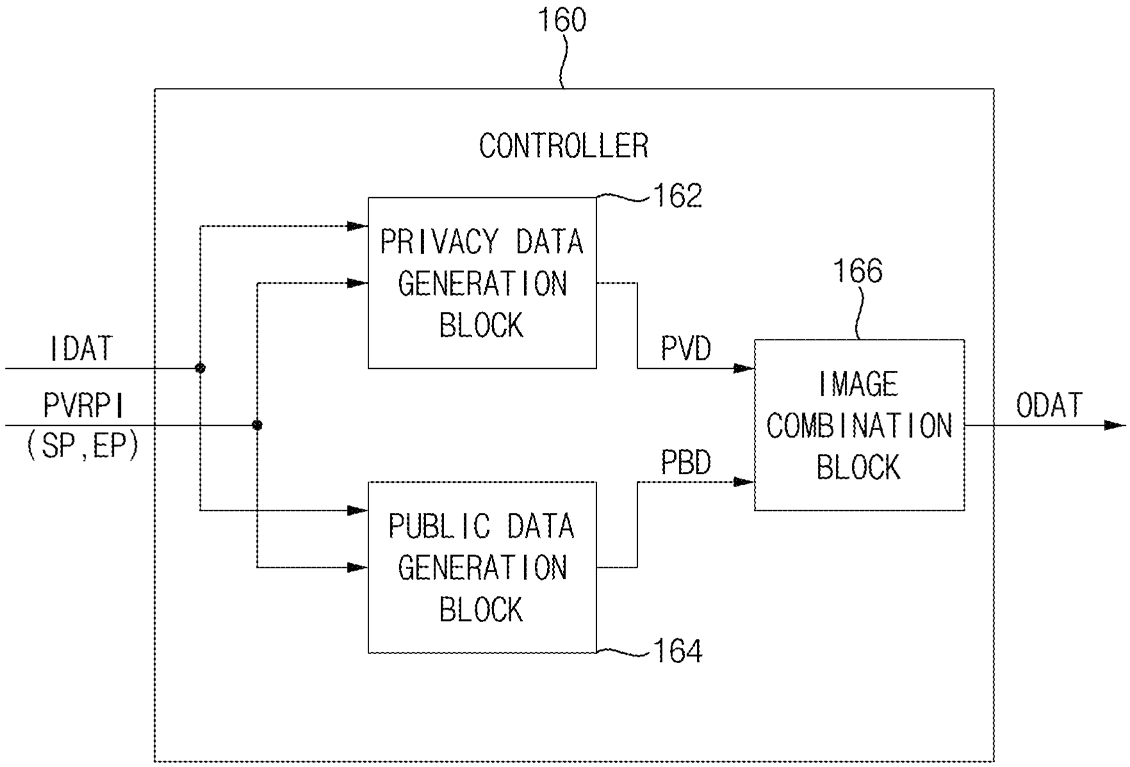
FIG. 5 is a block diagram illustrating a portion of a controller included in a display device according to embodiments.
Figure 6:
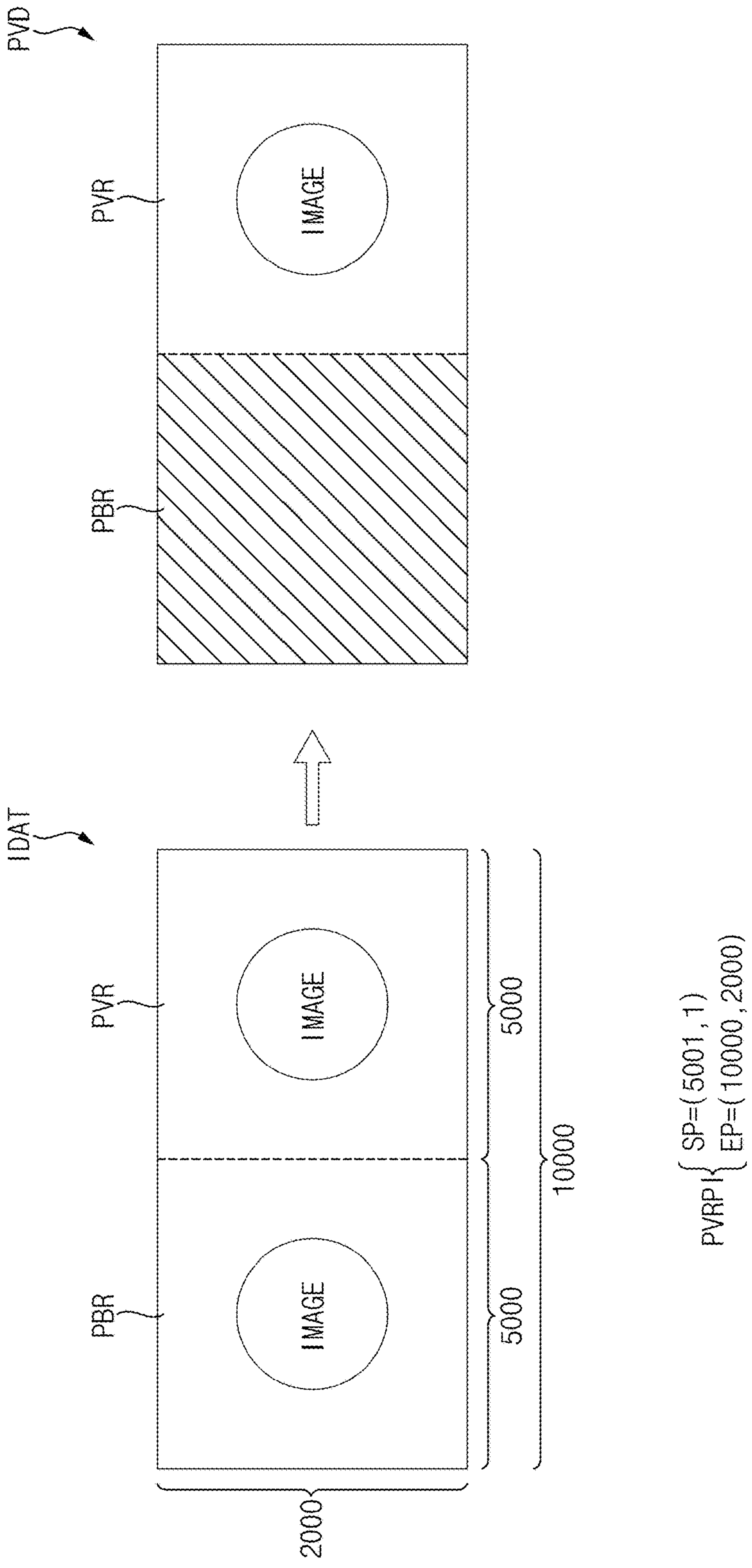
FIG. 6 is a diagram illustrating an example of an operation of a privacy data generation block.
Figure 7:
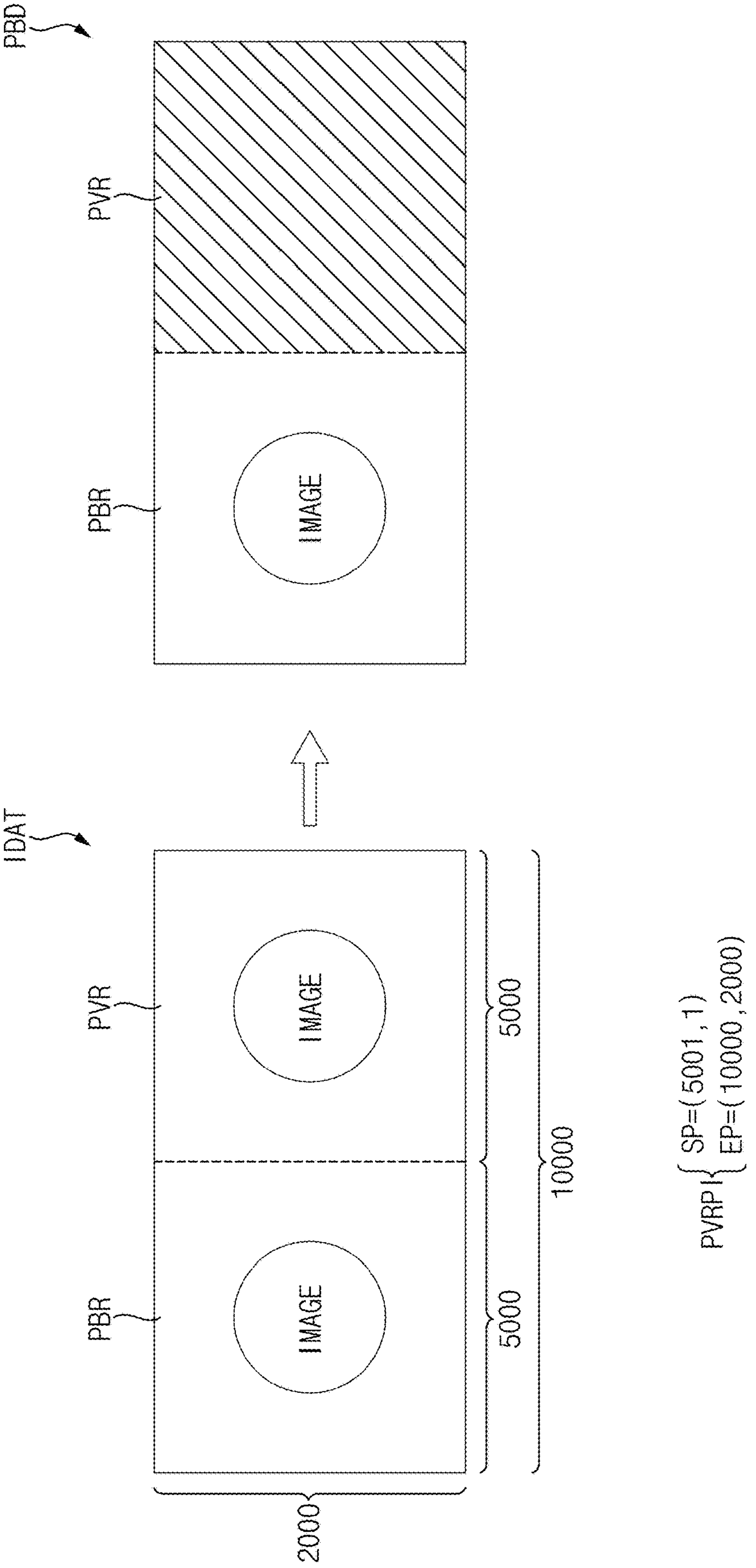
FIG. 7 is a diagram illustrating an example of an operation of a public data generation block.
Figure 8:
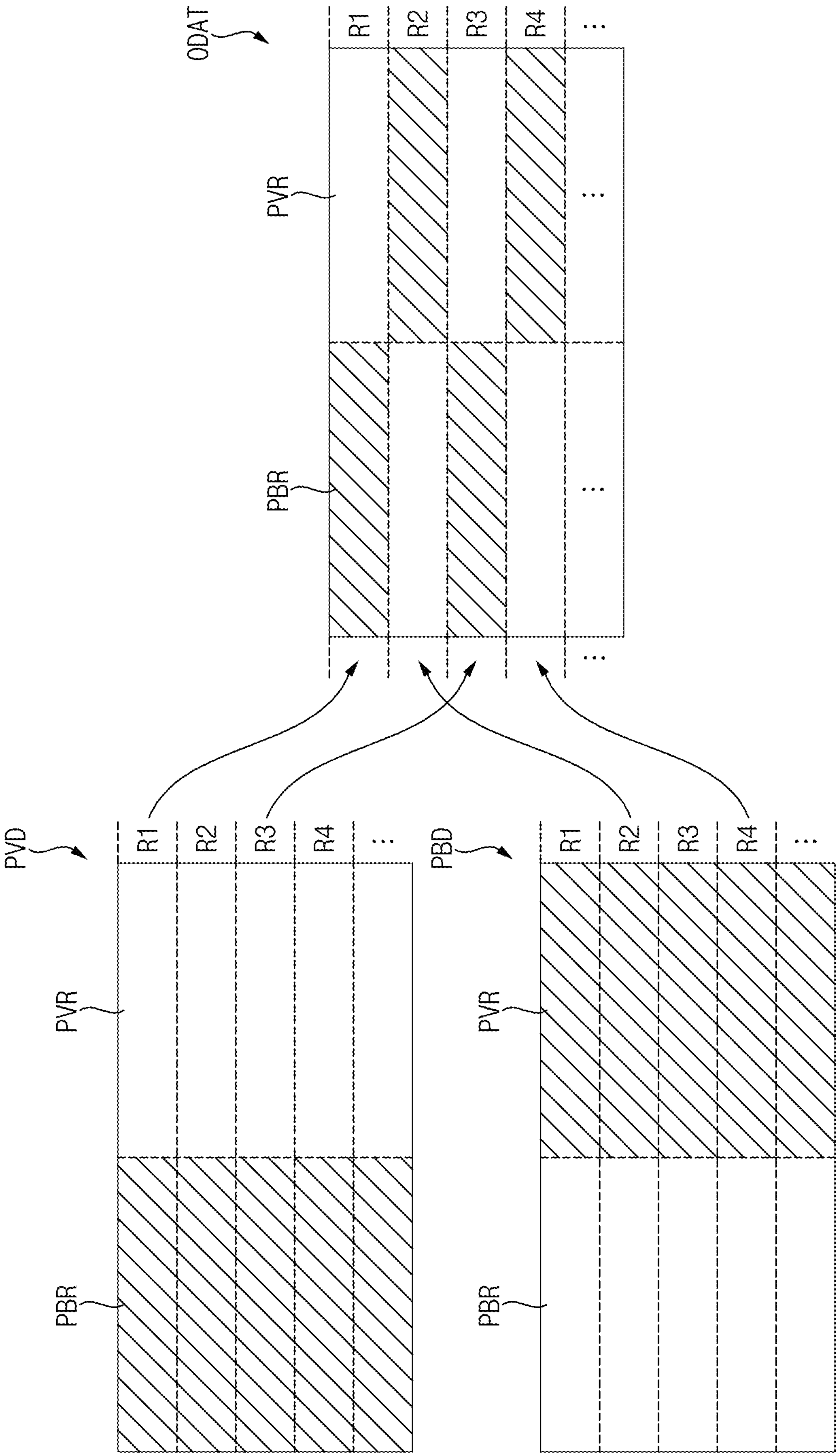
FIG. 8 is a diagram illustrating an example of an operation of an image combination block.

FIG. 5 is a block diagram illustrating a portion of a controller included in a display device according to embodiments. FIG. 6 is a diagram illustrating an example of an operation of a privacy data generation block. FIG. 7 is a diagram illustrating an example of an operation of a public data generation block. FIG. 8 is a diagram illustrating an example of an operation of an image combination block.

Referring to FIG. 5, a controller 160 (also referred to as a controller circuit) may include a privacy data generation block 162 (also referred to as a privacy data generation circuit), a public data generation block 164 (also referred to as a public data generation block) and an image combination block 166 (also referred to as an image combination circuit).

The privacy data generation block 162 may receive privacy region position information PVRPI and input image data IDAT. In some embodiments, the privacy region position information PVRPI may include a start position SP indicating an upper-left coordinate of a privacy region, and an end position EP indicating a lower-right coordinate of the privacy region. The privacy data generation block 162 may generate privacy image data PVD by converting the input image data IDAT for a public region excluding the privacy region in the entire region of a display panel into black data.

For example, as illustrated in FIG. 6, the display panel may have about 10,000 columns along a horizontal direction and about 2,000 rows along a vertical direction, and the input image data IDAT may include image data for all pixels of the display panel, or the pixels located in the 10,000 columns and the 2,000 rows. Further, if the privacy region position information PVRPI includes the start position SP of (5001, 1) and the end position EP of (10000, 2000), a rectangular region having a position at the 5001st column and the first row as an upper-left position, and a position at the 10000th column and the 2000th row as a lower-right position may be set as the privacy region PVR, and the remaining region may be set as the public region PBR. That is, a region corresponding to 5,000 left columns of the display panel may be set as the public region PBR, and a region corresponding to 5,000 right columns of the display panel may be set as the privacy region PVR. In this case, the privacy data generation block 162 may generate the privacy image data PVD by converting the input image data IDAT for the public region PBR, or the input image data IDAT for the region corresponding to the 5,000 left columns of the display panel into the black data.

The public data generation block 164 may receive the privacy region position information PVRPI and the input image data IDAT. The public data generation block 164 may generate public image data PBD by converting the input image data IDAT for the privacy region PVR having a position indicated by the privacy region position information PVRPI into the black data.

For example, as illustrated in FIG. 7, if the privacy region position information PVRPI includes the start position SP of (5001, 1) and the end position EP of (10000, 2000), the public data generation block 164 may generate the public image data PBD by converting the input image data IDAT for the privacy region PVR, or the input image data IDAT for the region corresponding to the 5,000 right columns of the display panel into the black data.

The image combination block 166 may receive the privacy image data PVD from the privacy data generation block 162, and may receive the public image data PBD from the public data generation block 164. Further, the image combination block 166 may generate output image data ODAT by combining the privacy image data PVD for odd-numbered rows and the public image data PBD for even-numbered rows.

For example, as illustrated in FIG. 8, the image combination block 166 may combine the privacy image data PVD for the odd-numbered rows R1, R3, . . . and the public image data PBD for the even-numbered rows R2, R4, . . . . Thus, the output image data ODAT generated by the image combination block 166 may include the privacy image data PVD for a first row R1, the public image data PBD for a second row R2, the privacy video data PVD for a third row R3, the public image data PBD for a fourth row R4, etc.

Accordingly, in the odd-numbered rows R1, R3, . . . where first pixels, or privacy pixels are arranged, the output image data ODAT may represent gray levels substantially the same as gray levels of the input image data IDAT with respect to the privacy region PVR, but may represent a 0-gray level with respect to the public region PBR. Further, in the even-numbered rows R2, R4, . . . where second pixels, or public pixels are arranged, the output image data ODAT may represent gray levels substantially the same as gray levels of the input image data IDAT with respect to the public region PBR, but may represent the 0-gray level with respect to the privacy region PVR.

In other words, in the public region PBR, the output image data ODAT may represent gray levels substantially the same as gray levels of the input image data IDAT with respect to the even-numbered rows R2, R4, . . . where the public pixels are arranged, but may represent the 0-gray level with respect to the odd-numbered rows R1, R3, . . . where the privacy pixels are arranged. Accordingly, only the public pixels may emit light in the public region PBR. Further, in the privacy region PVR, the output image data ODAT may represent gray levels substantially the same as gray levels of the input image data IDAT with respect to the odd-numbered rows R1, R3, . . . where the privacy pixels are arranged, but may represent the 0-gray level with respect to the even-numbered rows R2, R4, . . . where the public pixels are arranged. Accordingly, in the privacy region PVR, only the privacy pixels may emit light, and an image may be displayed with a narrow viewing angle.

Figure 9:
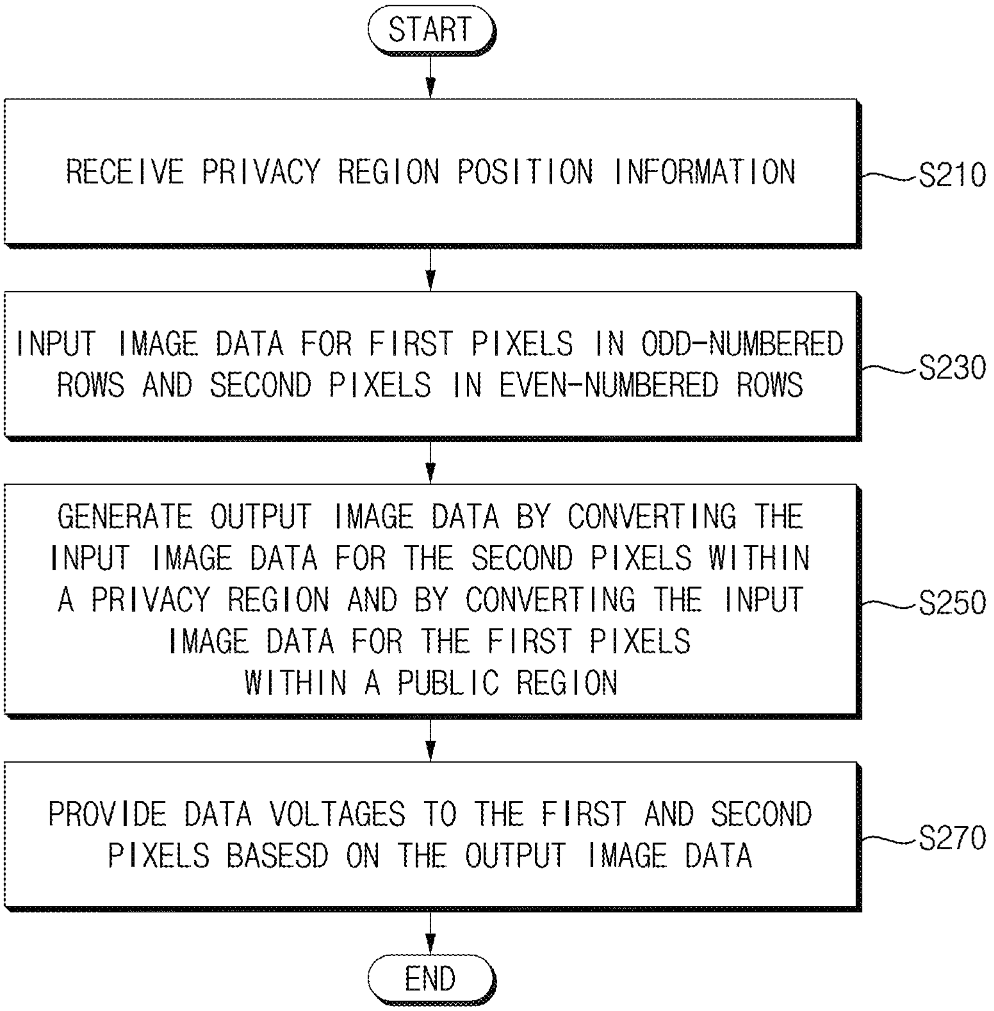
FIG. 9 is a flowchart illustrating a method of operating a display device according to embodiments.

FIG. 9 is a flowchart illustrating a method of operating a display device according to embodiments.

Referring to FIGS. 1 and 9, in a method of operating a display device 100 according to embodiments, a panel driver 120 may receive privacy region position information PVRPI indicating a position of a privacy region (S210). In some embodiments, the privacy region position information PVRPI may include a start position indicating an upper-left coordinate of the privacy region, and an end position indicating a lower-right coordinate of the privacy region.

First pixels PX1 may be arranged in odd-numbered rows R1, R3, . . . of a display panel 110, and second pixels PX2 having a viewing angle different from a viewing angle of the first pixels PX1. The panel driver 120 may receive input image data IDAT for the first pixels PX1 and the second pixels PX2 of the display panel 110 (S230). In some embodiments, the first pixels PX1 may be privacy pixels having a relatively narrow viewing angle, and the second pixels PX2 may be public pixels having a relatively wide viewing angle.

The controller 160 of the panel driver 120 may generate output image data ODAT by converting the input image data IDAT for the second pixels PX2 within the privacy region having the position indicated by the privacy region position information PVRPI into black data and by converting the input image data IDAT for the first pixels PX1 within a public region excluding the privacy region in the entire region of the display panel 110 into the black data (S250). In some embodiments, the black data may be, but is not limited to, image data representing a 0-gray level.

A data driver 130 of the panel driver 120 may provide data voltages DV to the first pixels PX1 and the second pixels PX2 based on the output image data ODAT (S270). In the privacy region, the data driver 130 may provide the first pixels PX1 with the data voltages DV corresponding to the input image data IDAT, and may provide the second pixels PX2 with the data voltage DV corresponding to the 0-gray level. Thus, in the privacy region, the first pixels PX1 may emit light, and the second pixels PX2 do not emit light. Accordingly, an image may be displayed with a narrow viewing angle in the privacy region. Further, in the public region, the data driver 130 may provide the second pixels PX2 with the data voltages DV corresponding to the input image data IDAT, and may provide the first pixels PX1 with the data voltage DV corresponding to the 0-gray level. Thus, in the public region, the second pixels PX2 may emit light, and the first pixels PX1 do not emit light. Accordingly, an image may be displayed with a wide viewing angle in the public region.

Figure 10:
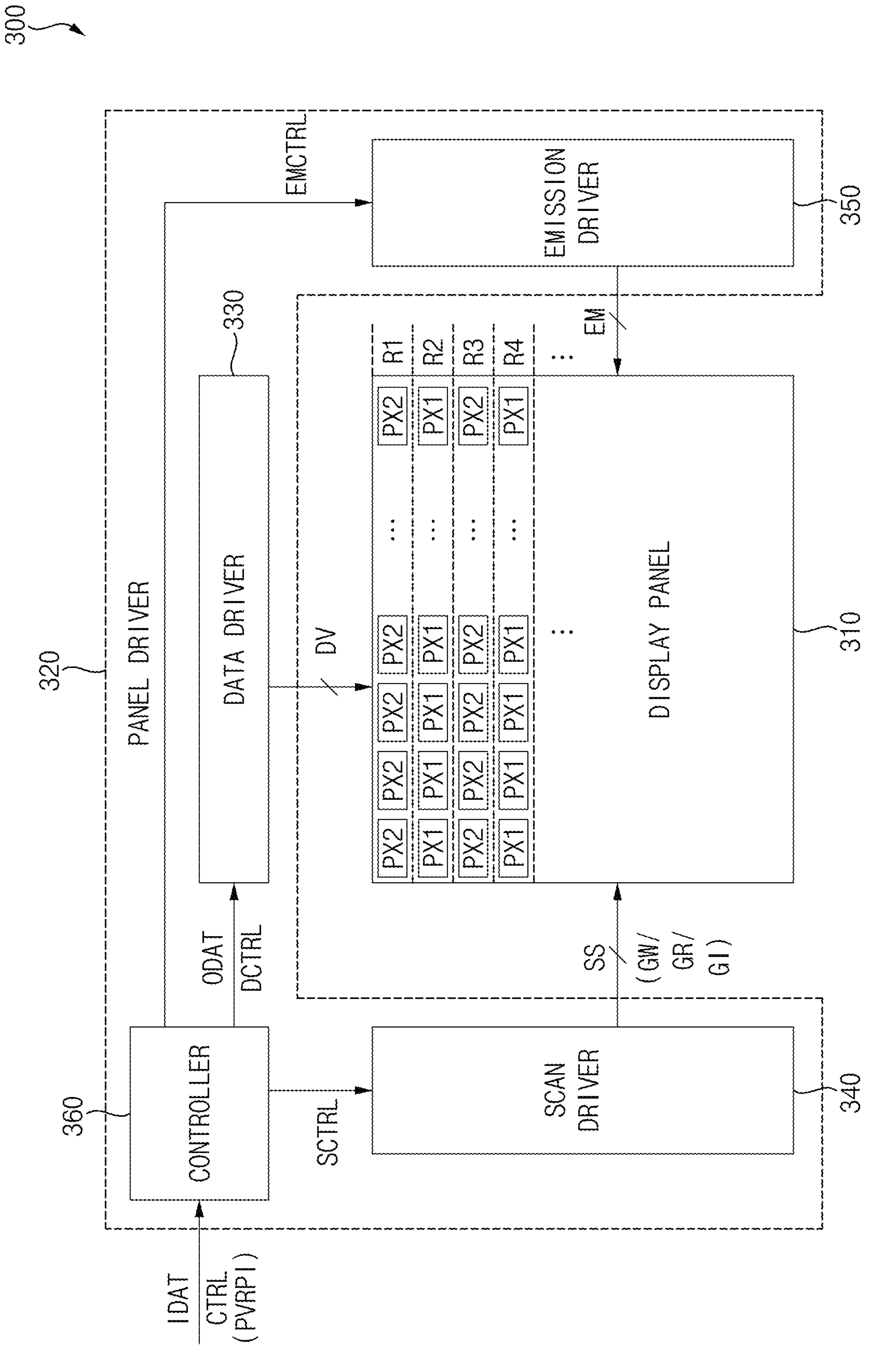
FIG. 10 is a block diagram illustrating a display device according to embodiments.

FIG. 10 is a block diagram illustrating a display device according to embodiments.

Referring to FIG. 10, a display device 300 according to embodiments may include a display panel 310 that includes first pixels PX1 and second pixels PX2, and a panel driver 320 that drives the display panel 310. The panel driver 320 may include a data driver 330, a scan driver 340, an emission driver 350 and a controller 360. The display device 300 of FIG. 10 may have a similar configuration and similar operation to a display device 100 of FIG. 1, except that the first pixels PX1 are arranged in even-numbered rows R2, R4, . . . of the display panel 310, and the second pixels PX2 are arranged in odd-numbered rows R1, R3, . . . of the display panel 310.

The first pixels PX1 arranged in the even-numbered rows R2, R4, . . . of the display panel 310 may be privacy pixels having a relatively narrow viewing angle, and the second pixels PX2 arranged in the odd-numbered rows R1, R3 of the display panel 310 may be public pixels having a relatively wide viewing angle. The panel driver 120 may receive privacy region position information PVRPI, and may set a privacy region and a public region based on the privacy region position information PVRPI. Further, the panel driver 120 may receive input image data IDAT, and may generate output image data ODAT by converting the input image data IDAT for the public region among the input image data IDAT for the even-numbered rows R2, R4, . . . into black data and by converting the input image data IDAT for the privacy region among the input image data IDAT for the odd-numbered rows R1, R3, . . . into the black data. The panel driver 120 may drive the display panel 110 based on the output image data ODAT. Accordingly, in the privacy region, only the first pixels PX1 may emit light, and an image may be displayed with narrow viewing angle. Further, in the public region, only the second pixels PX2 may emit light, and an image may be displayed with the wide viewing angle.

Figure 11:
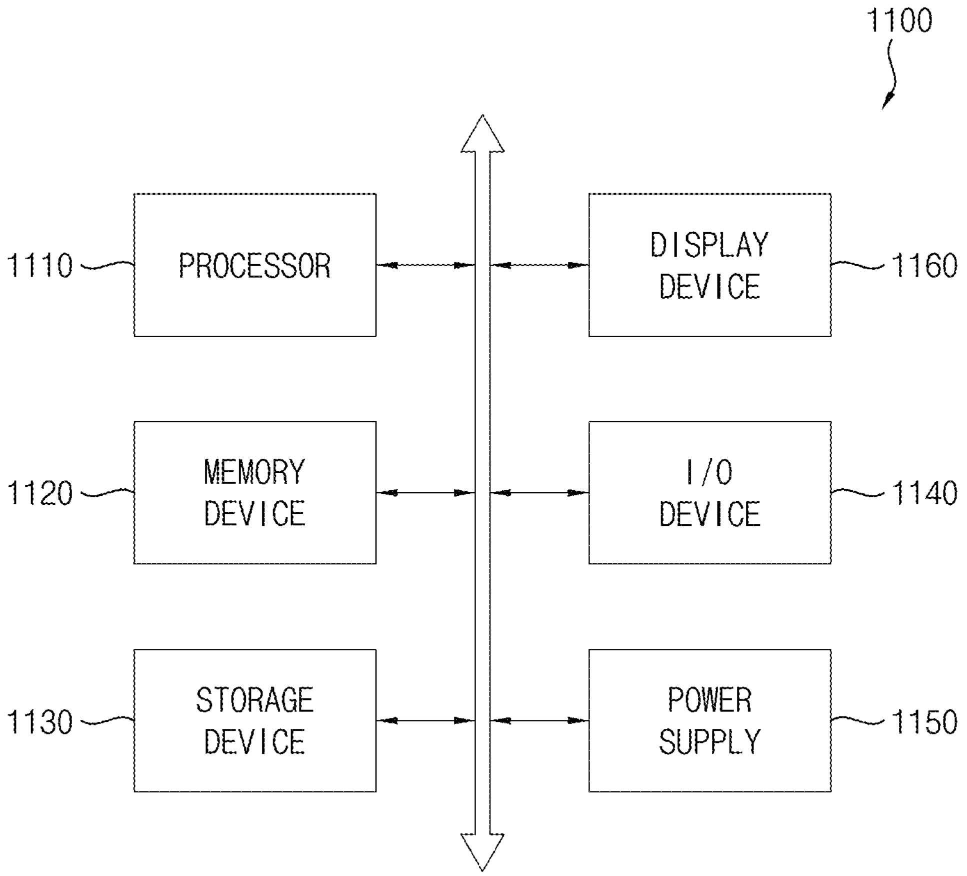
FIG. 11 is a block diagram illustrating an electronic device including a display device according to embodiments.

FIG. 11 is a block diagram illustrating an electronic device including a display device according to embodiments.

Referring to FIG. 11, an electronic device 1100 may include a processor 1110, a memory device 1120, a storage device 1130, an input/output (I/O) device 1140, a power supply 1150, and a display device 1160. The electronic device 1100 may further include a plurality of ports for communicating with, for example, a video card, a sound card, a memory card, a universal serial bus (USB) device, other electric devices, etc.

The processor 1110 may perform various computing functions or tasks. The processor 1110 may be, for example, an application processor (AP), a micro-processor, a central processing unit (CPU), etc. The processor 1110 may be coupled to other components via, for example, an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM)

device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be, for example, a solid state drive (SSD) device, a hard disk drive (HDD) device, a CD-ROM device, etc. The I/O device 1140 may be an input device such as, for example, a keyboard, a keypad, a mouse, a touch screen, etc., and an output device such as, for example, a printer, a speaker, etc. The power supply 1150 may supply power for operations of the electronic device 1100. The display device 1160 may be coupled to other components via the buses or other communication links.

In the display device 1160, first pixels may be arranged in a first row of a display panel, and second pixels having a viewing angle different from a viewing angle of the first pixels may be arranged in a second row of the display panel. A panel driver may receive privacy region position information indicating a position of a privacy region, and may drive the display panel such that the first pixels may emit light in the privacy region and the second pixels may emit light in a public region other than the privacy region. Accordingly, a partial region of the display panel may be set as the privacy region, the remaining region of the display panel may be set as the public region, an image may be displayed with a first viewing angle (e.g., a narrow viewing angle) in the privacy region, and an image may be displayed with a second viewing angle (e.g., a wide viewing angle) in the public region. Further, a position and a size of the privacy region can be readily controlled.

According to embodiments, the electronic device 1100 may be any electronic device including the display device 1160, such as, for example, a digital television, a 3D television, a personal computer (PC), a home appliance, a laptop computer, a cellular phone, a smart phone, a tablet computer, a wearable device, a personal digital assistant (PDA), a portable multimedia player (PMP), a digital camera, a music player, a portable game console, a navigation system, etc.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood by those of ordinary skill in the art that various changes in form and detail may be made therein without departing from the spirit and scope of the present invention as defined by the following claims.

What is claimed is:

1. A display device, comprising:

a display panel including first pixels arranged in a first row and second pixels arranged in a second row, wherein a viewing angle of the first pixels is different from a viewing angle of the second pixels, wherein the first pixels and the second pixels are disposed in a privacy region of the display panel, and the first pixels and the second pixels are disposed in a public region of the display panel which is different from the privacy region; and a panel driver configured to:

receive privacy region position information indicating a position of the privacy region; and drive the display panel such that the first pixels emit light in the privacy region of the display panel and the second pixels emit light in the public region of the display panel.

2. The display device of claim 1, wherein the second pixels in the privacy region do not emit light, and the first pixels in the public region do not emit light.

3. The display device of claim 1, wherein the first pixels are privacy pixels, the second pixels are public pixels, and the viewing angle of the public pixels is greater than the viewing angle of the privacy pixels.

4. The display device of claim 3, wherein the first row is one of a plurality of odd-numbered rows of the display panel and the second row is one of a plurality of even-numbered rows of the display panel, and wherein the privacy pixels are arranged in the odd-numbered rows of the display panel, and the public pixels are arranged in the even-numbered rows of the display panel.

5. The display device of claim 3, wherein the first row is one of a plurality of even-numbered rows of the display panel and the second row is one of a plurality of odd-numbered rows of the display panel, and wherein the public pixels are arranged in the odd-numbered rows of the display panel, and the privacy pixels are arranged in the even-numbered rows of the display panel.

6. The display device of claim 1, wherein the privacy region position information includes a start position indicating an upper-left coordinate of the privacy region, and an end position indicating a lower-right coordinate of the privacy region.

7. The display device of claim 1, wherein the panel driver is further configured to:

receive input image data for the display panel;

generate output image data by converting the input image data for the public region among the input image data for the first row into black data and by converting the input image data for the privacy region among the input image data for the second row into the black data; and drive the display panel based on the output image data.

8. The display device of claim 1, wherein the panel driver includes:

a controller configured to receive the privacy region position information and input image data, and to generate output image data based on the privacy region position information and the input image data; and a data driver configured to provide data voltages to the first pixels and the second pixels based on the output image data.

9. The display device of claim 8, wherein the controller includes:

a privacy data generation block configured to receive the privacy region position information and the input image data, and to generate privacy image data by converting the input image data for the public region into black data;

a public data generation block configured to receive the privacy region position information and the input image data, and to generate public image data by converting the input image data for the privacy region into the black data; and an image combination block configured to receive the privacy image data and the public image data, and to generate the output image data by combining the privacy image data for the first row and the public image data for the second row.

10. The display device of claim 1, wherein each of the first pixels and the second pixels includes:

a first transistor including a top gate connected to a gate node, a first terminal, a second terminal connected to a source node, and a bottom gate;

a second transistor configured to apply a data voltage to the gate node in response to a writing signal;

a third transistor configured to apply a reference voltage to the gate node in response to a reference signal;

a fourth transistor configured to apply an initialization voltage to the source node in response to an initialization signal;

a fifth transistor configured to connect a first power supply voltage line and the first terminal of the first transistor in response to an emission signal;

a storage capacitor connected between the gate node and the source node;

a holding capacitor configured to hold a voltage of the source node; and a light emitting element including an anode connected to the source node and a cathode connected to a second power supply voltage line, wherein the light emitting element of each of the first pixels has a first viewing angle, and the light emitting element of each of the second pixels has a second viewing angle greater than the first viewing angle.

11. The display device of claim 10, wherein the second transistor includes a gate that receives the writing signal, a first terminal connected to a data line, and a second terminal connected to the gate node, wherein the third transistor includes a gate that receives the reference signal, a first terminal connected to a line that transfers the reference voltage, and a second terminal connected to the gate node, wherein the fourth transistor includes a gate that receives the initialization signal, a first terminal connected to the source node, and a second terminal connected to a line that transfers the initialization voltage, and wherein the fifth transistor includes a gate that receives the emission signal, a first terminal connected to the first power supply voltage line, and a second terminal connected to the first terminal of the first transistor.

12. A display device, comprising:

a display panel including first pixels arranged in odd-numbered rows and second pixels arranged in even-numbered rows, wherein a viewing angle of the first pixels is different from a viewing angle of the second pixels, wherein the first pixels and the second pixels are disposed in a privacy region of the display panel, and the first pixels and the second pixels are disposed in a public region of the display panel which is different from the privacy region; and a controller configured to:

receive privacy region position information and input image data;

generate output image data by converting the input image data for the second pixels within the privacy region having a position indicated by the privacy region position information into black data, and by converting the input image data for the first pixels within the public region into the black data; and a data driver configured to provide data voltages to the first pixels and the second pixels based on the output image data.

13. The display device of claim 12, wherein, in the privacy region, the first pixels emit light and the second pixels do not emit light, and wherein, in the public region, the first pixels do not emit light and the second pixels emit light.

14. The display device of claim 12, wherein the first pixels are privacy pixels, the second pixels are public pixels, and the viewing angle of the public pixels is greater than the viewing angle of the privacy pixels.

15. The display device of claim 12, wherein the privacy region position information includes a start position indicating an upper-left coordinate of the privacy region, and an end position indicating a lower-right coordinate of the privacy region.

16. The display device of claim 12, wherein the controller includes:

a privacy data generation block configured to receive the privacy region position information and the input image data, and to generate privacy image data by converting the input image data for the public region into the black data;

a public data generation block configured to receive the privacy region position information and the input image data, and to generate public image data by converting the input image data for the privacy region into the black data; and an image combination block configured to receive the privacy image data and the public image data, and to generate the output image data by combining the privacy image data for the odd-numbered rows and the public image data for the even-numbered rows.

17. A method of operating a display device, the method comprising:

receiving privacy region position information indicating a position of a privacy region of a display panel;

receiving input image data for first pixels arranged in odd-numbered rows of the display panel and second pixels arranged in even-numbered rows of the display panel, wherein a viewing angle of the first pixels is different from a viewing angle of the second pixels, wherein the first pixels and the second pixels are disposed in the privacy region, and the first pixels and the second pixels are disposed in a public region of the display panel which is different from the privacy region;

generating output image data by converting the input image data for the second pixels within the privacy region into black data and by converting the input image data for the first pixels within the public region into the black data; and providing data voltages to the first pixels and the second pixels based on the output image data.

18. The method of claim 17, wherein, in the privacy region, the first pixels emit light and the second pixels do not emit light, and wherein, in the public region, the first pixels do not emit light and the second pixels emit light.

19. The method of claim 17, wherein the first pixels are privacy pixels, the second pixels are public pixels, and the viewing angle of the public pixels is greater than the viewing angle of the privacy pixels.

20. The method of claim 17, wherein the privacy region position information includes a start position indicating an upper-left coordinate of the privacy region, and an end position indicating a lower-right coordinate of the privacy region.

* * * * *